United States Patent [19]

Ko

[11] 4,204,847
[45] May 27, 1980

[54] MIST ELIMINATOR DEVICE FOR A WET SCRUBBER APPARATUS

[75] Inventor: Raymond Ko, Ontario, Canada

[73] Assignee: American Air Filter Company, Inc., Louisville, Ky.

[21] Appl. No.: 912,756

[22] Filed: Jun. 5, 1978

[51] Int. Cl.² .................. B01D 47/06; B01D 45/06
[52] U.S. Cl. .................................. 55/257 PV; 55/440
[58] Field of Search ........... 55/257 PV, 257 MP, 440, 55/442, 443–447, DIG. 23; 122/488, 492

[56] References Cited

U.S. PATENT DOCUMENTS

| | | | |
|---|---|---|---|
| 2,266,335 | 12/1941 | Roche, Jr. et al. | 55/440 |
| 2,911,011 | 11/1959 | Niehart | 55/257 PV |
| 3,517,486 | 6/1970 | Golden | 55/257 PV |
| 3,849,095 | 11/1974 | Regehr | 55/440 |
| 3,912,471 | 10/1975 | Cotton, Jr. | 55/257 PV |

FOREIGN PATENT DOCUMENTS 2257369  2/1911  Fed. Rep. of Germany .... 55/DIG. 23

Primary Examiner—David L. Lacey
Attorney, Agent, or Firm—Thomas G. Anderson; Jon C. Winger

[57] ABSTRACT

A mist eliminator device, particularly well suited for use in a wet scrubber apparatus, has a plurality of parallel spaced apart chevron shaped baffle members transversely disposed in a peripheral frame to define a plurality of parallel correspondingly chevron shaped gas flow passages each having an inlet and outlet accommodating the flow of gas through the mist eliminator. Each passage includes an upstream branch disposed proximate the gas inlet and a downstream branch disposed proximate the gas outlet. The upstream branch of each gas flow passage is obliquely oriented to the plane of the peripheral frame and the downstream branch is oriented perpendicularly to the same plane. A mist trapping flange projects into each upstream branch of the gas flow passages and another mist trapping flange projects into each downstream branch of the gas flow passages.

12 Claims, 3 Drawing Figures

MIST ELIMINATOR DEVICE FOR A WET SCRUBBER APPARATUS

BACKGROUND OF THE INVENTION (1) Field of the Invention

This invention relates to wet scrubbers and more particularly relates to a mist eliminator device for a wet scrubber apparatus.

(2) Description of the Prior Art

In the cleaning of waste or a dirty gas stream in a wet scrubber apparatus, a liquid solution is sprayed into the gas stream to react with or absorb the particulate materials which are to be removed. As the gas continues through the scrubber apparatus, some of the liquid is entrained in the gas stream. In most scrubber apparatuses, mist eliminator devices are provided to remove the entrained liquid from the gas stream. These mist eliminator devices come in many different forms and arrangements. These forms include packed beds where the pressure drop of the gas passing therethrough is relatively high, and baffles arranged in zig-zag configurations where the gas changes directions, angularly, several different times as it passes through the mist eliminator device.

Mist eliminator devices containing baffles arranged in zig-zag configurations are the most common in use today. These eliminators usually consist of a plurality of baffles in parallel, each baffle being of a "saw-tooth" configuration with the passages between the baffles defining "zig-zag" paths. The configuration is such that liquid particles in the gas stream, upon a change in the angular direction of the gas stream, impinge upon the surfaces of the baffles and fall downwardly out of the gas stream. However, in many instances the liquid droplets upon impinging with the baffle surface splatter in such a manner that the liquid passes back into the gas stream and continues with the gas stream out of the scrubbing apparatus. In order to improve the efficiency of the "zig-zag" arrangement, the tendency has been to extend the zig-zag configuration by increasing the number of turns. However, this results in pressure drop increases and consequently larger fans for moving the gas stream therethrough are required.

Several references which teach different mist eliminators for use in wet scrubber apparatuses include: U.S. Pat. No. 2,583,390; U.S. Pat. No. 3,444,670; U.S. Pat. No. 3,353,799 and U.S. Pat. No. 3,520,116.

SUMMARY OF THE INVENTION

The present invention advantageously provides a mist eliminator device having an improved baffle arrangement for advantageous use in a wet scrubber apparatus. The baffles utilized in the present invention include an upstream portion inclined to the flow of gas passing through the scrubber apparatus so the entrained water droplets impinge upon the baffle surface and then drop out of the gas stream and a downstream portion which is parallel to the flow of gas through the scrubber apparatus so the gas is "straightened out" by the time it gets through the mist eliminator thereby decreasing the pressure drop over conventional zig-zag arrangements. Also, mist trapping flanges are provided to capture some of the liquid mist.

Various other features of the present invention will become obvious to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
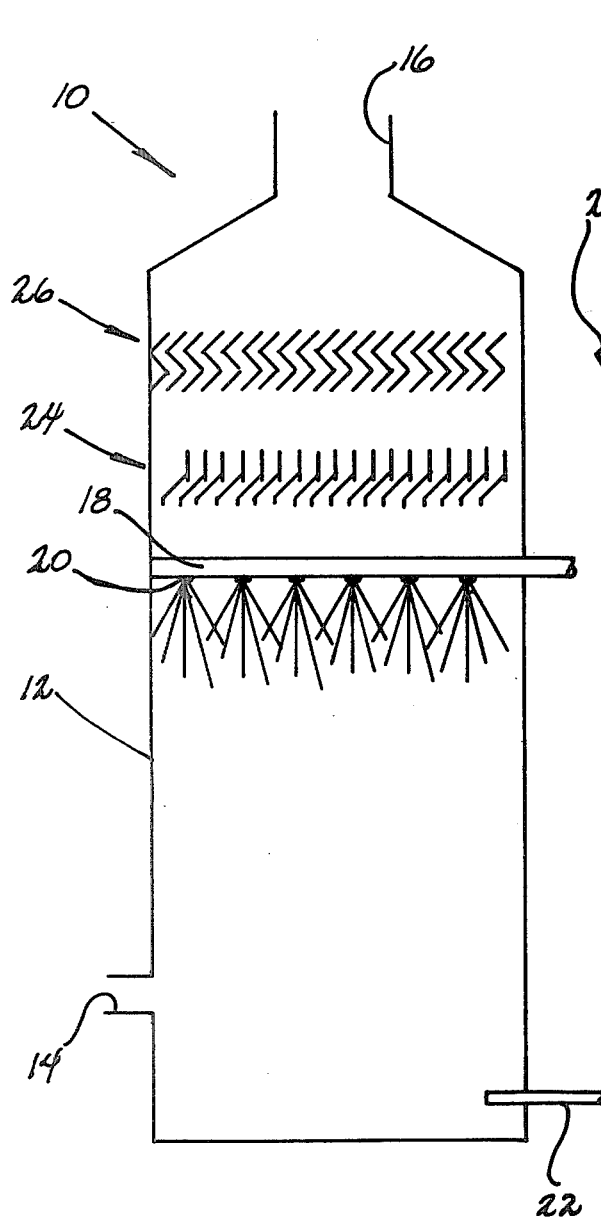
FIG. 1 is a vertical sectional view of a wet scrubber apparatus utilizing the mist eliminator device of the present invention.

FIG. 1 of the drawing illustrates a wet scrubber apparatus, generally denoted as the numeral 10, which includes a wet scrubbing tower 12 having a dirty gas stream flow-through inlet 14 in the bottom thereof and a clean gas stream flow-through outlet 16 in the top thereof. The dirty gas stream flow-through inlet 14 is in fluid communication with a waste gas source (not shown) and the clean gas stream flow-through outlet 16 is either open to the atmosphere or is in fluid communication with other process cleaning or treating devices (not shown).

The scrubbing tower 12 is also provided with at least one appropriate opening between the dirty gas stream inlet 14 and the clean gas stream outlet 16 to receive a cleaning or scrubbing solution conduit 18 therethrough. Conduit 18 is in flow communication with a cleaning solution source (not shown) which may be water or a chemically reactive solution make-up tank for supplying a specific chemical solution to the scrubber apparatus to react with chemically reactive substances in the dirty gas stream passing through the scrubber apparatus. Spray devices, such as nozzles, are disposed within the scrubbing tower 12 as indicated at 20 in the drawing so as to supply solution substantially uniformly across the tower 12.

The scrubbing tower 12 is further provided with an appropriate opening in the bottom thereof to receive a dirty solution discharge conduit 22 therethrough. Discharge conduit 22 is in flow communication at one of its ends with the dirty solution build up in the bottom of the scrubber tower 12 which forms from the reaction of the cleaning solution and the contaminants in the gas stream. A waste solution receiving means (not shown) is in flow communication with the discharge conduit at its opposite end.

Two mist eliminating devices may be provided in the scrubber tower 12 between the spraying nozzles 20 and the clean gas stream outlet 16 to remove entrained liquid from the cleaned gas stream before the cleaned gas leaves the scrubbing tower 12. The first mist eliminating device, denoted by the numeral 24, removes the coarse or large mist particles and the second mist eliminating device, denoted by the numeral 26, removes finer or smaller mist particles.

Figure 2:
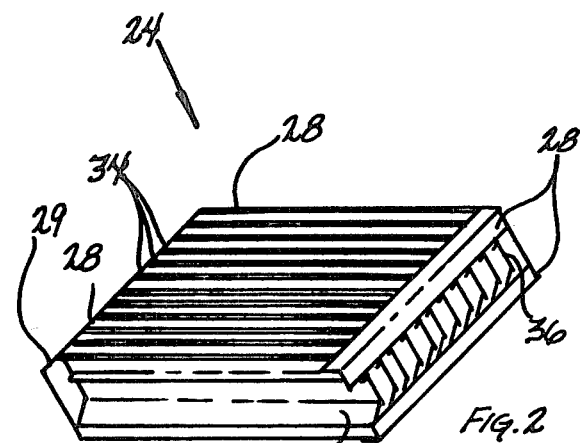
FIG. 2 is an enlarged perspective view of the mist eliminator device of the present invention.
Figure 3:
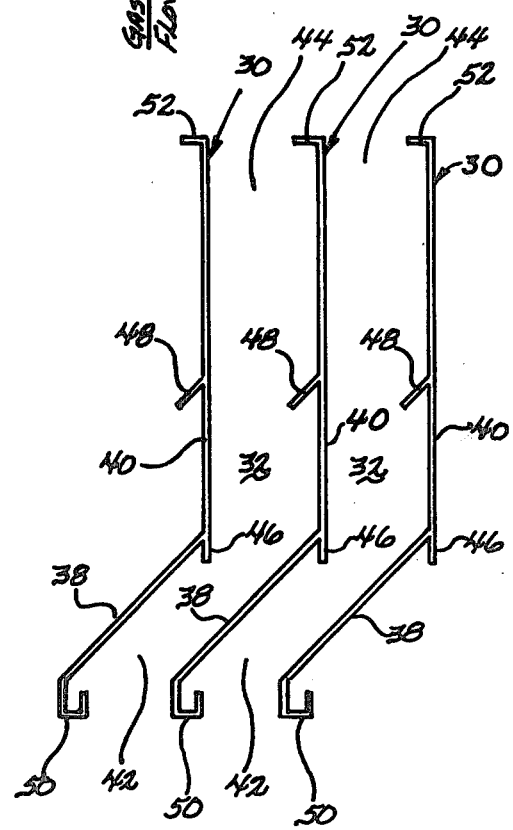
FIG. 3 is an enlarged transverse cross-sectional view of a portion of the mist eliminator device as viewed in FIG. 1.

As can be best seen in FIGS. 2 and 3, the first mist eliminator device 24 is formed of a peripheral frame, generally denoted as the numeral 28, defining a gas flow aperture 29 therethrough, and a plurality of elongated baffle members 30. The elongated baffle members 30 are disposed in parallel spaced apart relationship transversely across the gas flow aperture 29 of the peripheral frame 28 to divide the gas flow aperture 29 into a plurality of parallel gas flow passages 32 defined between adjacent baffle members 30. Each elongated baffle 30 is attached at its opposite ends 34, 36 to the peripheral frame 28.

The terms "upstream" and "downstream" will be subsequently used for the sake of simplicity and clearness. These terms will be used to define the position of various components to each other relative to the gas flow, and have the following meanings:

"upstream"—toward the source of the gas flow;

"downstream"—away from the source of the gas flow.

With continued reference to FIGS. 2 and 3, each elongated baffle 30 has an upstream planar wall section 38 inclined to the transverse plane of the peripheral frame 28 and a downstream planar wall section 40 continuing from the upstream planar wall section 38, but being oriented perpendicularly to the transverse plane of the peripheral frame 28. Thus, the gas flow passages 32 defined between adjacent baffle members 30 each have an upstream portion 42 inclined to the transverse plane of the peripheral frame 28 and a downstream portion 44 oriented perpendicularly to the transverse plane of the peripheral frame 28.

Each baffle member 30 has a first flange 46 extending from the downstream planar wall section 40 proximate the junction of the upstream planar wall section 38 and downstream planar wall section 40 and into one of the gas flow passages 32 defined by the elongated baffle member 30 from which it extends. Preferably, the first flange 46 is in the same plane as the downstream planar wall section 40 and is continuous laterally substantially the entire length of the elongated baffle member 30. Further, the first flange 46 is disposed at an acute angle, for example 45 degrees, to the upstream planar wall section 38.

Each baffle member 30 also has a second flange 48 extending from the downstream planar wall section 40 and into the other one of the gas flow passages 32 defined by the elongated baffle member 30 from which it extends. Preferably, the second flange 48 obliquely extends from the downstream planar wall section 40 in a generally upstream direction of the gas flow. An acute angle between the downstream planar wall section 40 and second flange 48 has been found to be approximately 45 degrees. The second flange 48 is continuous laterally substantially the entire length of the baffle member 30 and is generally parallel to upstream planar wall section 38.

As can be best seen in FIG. 3, each baffle member 30 also has means for reinforcing the upstream planar wall section 38 such as a reinforcing flange 50 formed along the free edge of the upstream planar wall section 38. Another reinforcing flange 52 can be formed along the free edge of the downstream planar wall section 40.

The first mist eliminator device 24 is placed within the scrubber tower 12 such that the transverse plane of the peripheral frame 28 is generally perpendicular to the gas stream flow travelling toward the mist eliminator 24.

The second mist eliminator device 26 may be of the conventional zig-zag configuration discussed above, or may be of the same configuration as first mist eliminator device 24, but with closer spacing between the baffle members 30.

In operation, a dirty gas stream enters the scrubber tower 12 through the dirty gas stream flow-through inlet 14 and flows toward the clean gas stream flow-through outlet 16. As the dirty gas stream moves toward the outlet 16 it is subjected to a spray of water or chemical reactive solution from the nozzles 20. Subsequently, the gas stream now containing entrained liquid mist of either water of chemical reactive solution flows to the first mist eliminator device 24. Upon reaching the first mist eliminator device 24 the gas stream first enters the upstream portion 42 of the gas flow passages 32 wherein the gas stream is caused to change its flow direction to correspond to the inclination of the upstream portions 42. In so doing, some liquid mist is centrifuged out of the gas stream and additional liquid mist is separated out of the gas stream by impact against the upstream planar wall sections 40 of the baffle members 30. This separated liquid mist migrates in a downstream direction along the surface of the upstream planar wall sections 40 until it meets the first flanges 46 which trap this separated liquid mist and cause it to coalesce. The coalesced liquid mist then drains in coalesced streams back out of the upstream portions 42 of the gas flow passages 32 counter the flow of the gas stream. Because of its coalesced condition, it is not re-entrained in the gas stream. Subsequently, the gas stream flows from the upstream portions 42 of the gas flow passages 32 whereupon it is again caused to change its flow direction back to its original direction prior to entering the upstream portions 42 of the gas flow passages. In so doing, additional liquid mist is both separated out of the gas stream by centrifugal action and by impact against the downstream planar wall sections 40 of the baffle members 30. This separated liquid mist migrates in a downstream direction along the surface of the downstream planar wall sections 40 until it meets the second flange 48 which traps this separated liquid mist and causes it to coalesce. The coalesced liquid mist then drains in coalesced streams back out of the gas flow passages 32 counter to the flow of the gas stream, but because of its coalesced condition it is not re-entrained in the gas stream. The separated now coalesced liquid mist falls downwardly to the bottom of the scrubbing tower 12 wherefrom it is removed via the discharge conduit 22.

After exiting the downstream portions 44 of the first mist eliminator device 24, the gas stream continues toward and through the second mist eliminator device 26 wherein any liquid mist remaining in the gas stream is removed prior to the discharge of the gas stream through the clean gas stream flow-through outlet 16 of the scrubbing tower 12.

The foregoing detailed description is given primarily for clearness of understanding and no unnecessary limitations should be understood therefrom for modifications will become obvious to those skilled in the art upon reading this disclosure and may be made without departing from the spirit of the invention or the scope of the appended claims.

I claim:

1. A mist eliminator device for removing liquid or a liquid slurry from a gas stream passing therethrough, comprising:

a peripheral frame defining an axially extending gas flow aperture therethrough;

a plurality of elongated baffle members disposed in parallel spaced apart relationship transversely across the gas flow aperture of the peripheral frame and defining a plurality of axially extending gas flow passages, each passage having a gas inlet and a gas outlet; and, each elongated baffle member having an upstream wall section extending from a respective one of said gas inlets and being inclined to the transverse plane of the peripheral frame, a flow straightening downstream wall section continuing from the upstream wall section to a respective one of said gas outlets and being oriented perpendicularly to the transverse plane of the peripheral frame, a first collecting flange on one side thereof extending toward said respective gas inlet from the downstream wall section proximate the junction of the upstream and downstream wall sections, and a second collecting flange on the other side thereof axially intermediate of the downstream wall section and extending obliquely therefrom in a plane generally parallel to the upstream wall section and being spaced from said first collecting flange, thereby accommodating simultaneous mist separation and flow straightening between said first and second collecting flanges to essentially assure axial alignment of the gas stream prior to discharge from the device while minimizing pressure losses incident thereto.

2. The mist eliminator device of claim 1, wherein the second flange is continuous laterally substantially the entire length of the elongated baffle member.

3. The mist eliminator device of claim 1, wherein said second flange is disposed at an acute angle to the downstream wall section of approximately 45 degrees.

4. The mist eliminator device of claim 1, wherein the first flange is in the same plane as the downstream wall section.

5. The mist eliminator device of claim 1, wherein the first flange is continuous laterally substantially the entire length of the elongated baffle member.

6. The mist eliminator device of claim 1, wherein the first flange is disposed at an acute angle to the upstream wall section.

7. The mist eliminator device of claim 6, wherein the acute angle between the first flange and upstream wall section is approximately 45 degrees.

8. The mist eliminator device of claim 1, wherein each elongated baffle member is attached at its ends to the peripheral frame.

9. The mist eliminator device of claim 1, wherein each of said baffle members comprise means for reinforcing the upstream wall section.

10. The mist eliminator device of claim 9, wherein the means for reinforcing the upstream wall section comprises a reinforcing flange formed along the free edge of the upstream wall section.

11. A wet scrubber apparatus comprising:
a scrubber housing having a flow-through inlet and a flow-through outlet;
means for adding a liquid spray to a gas stream flow from the flow-through inlet toward the flow-through outlet;
at least one mist eliminator device positioned between the liquid spray means and the flow-through outlet comprising;
a peripheral frame defining an axially extending gas flow aperture therethrough;
a plurality of elongated baffle members disposed in parallel spaced apart relationship transversely across the gas flow aperture of the peripheral frame and defining a plurality of axially extending gas flow passages, each passage having a gas inlet and a gas outlet; and,
each elongated baffle member having an upstream wall section extending from a respective one of said gas inlets and being inclined to the transverse plane of the peripheral frame, a flow straightening downstream wall section continuing from the upstream wall section to a respective one of said gas outlets and being oriented perpendicularly to the transverse plane of the peripheral frame, a first collecting flange on one side thereof extending toward said respective gas inlet from the downstream wall section, and a second collecting flange on the other side thereof axially intermediate of the downstream wall section and extending obliquely therefrom in a plane generally parallel to the upstream wall section; and,
the mist eliminator device being oriented within the scrubber housing with the transverse plane of the peripheral frame disposed perpendicularly to the gas stream flow moving toward the mist eliminator device.

12. A device for removing liquid or liquid slurry mist from a gas stream, comprising:
a plurality of adjacent baffle members disposed in parallel spaced relation transversely of the path of said gas stream and defining a plurality of axially extending gas passages, said gas passages each having a gas inlet and a gas outlet;
said baffle members each having an upstream planar wall section extending from a respective gas inlet and a flow straightening downstream planar wall section intersecting the upstream wall section and extending therefrom to a respective gas outlet at an oblique angle to said upstream wall section, a first collecting flange on one side thereof extending from the juncture of said first and second wall sections in substantially the same plane as the downstream wall section, and a second collecting flange on the other side thereof disposed generally intermediate of said downstream wall section and extending obliquely therefrom toward the respective first collecting flange of an associated adjacent baffle member and being spaced from said first mentioned collecting flange; and
each of said gas passages including first and second mist separation and coalescence zones proximate to respective first and second collecting flanges, and an axially extending gas discharge zone adjacently overlying said second mist zone and extending substantially the length of said downstream wall section, thereby accommodating simultaneous mist separation and discharge flow alignment to minimize pressure losses incident to gas flow through the device.

* * * * *